No. 608,790. Patented Aug. 9, 1898.
H. OTENHOUSE.
CULTIVATOR.
(Application filed Oct. 29, 1897.)
(No Model.) 2 Sheets—Sheet 1.

Witnesses
Jas. H. McCathran
U. B. Hillyard

Inventor
Henry Otenhouse
By his Attorneys,
C. A. Snow & Co.

No. 608,790. Patented Aug. 9, 1898.
H. OTENHOUSE.
CULTIVATOR.
(Application filed Oct. 29, 1897.)
(No Model.) 2 Sheets—Sheet 2.
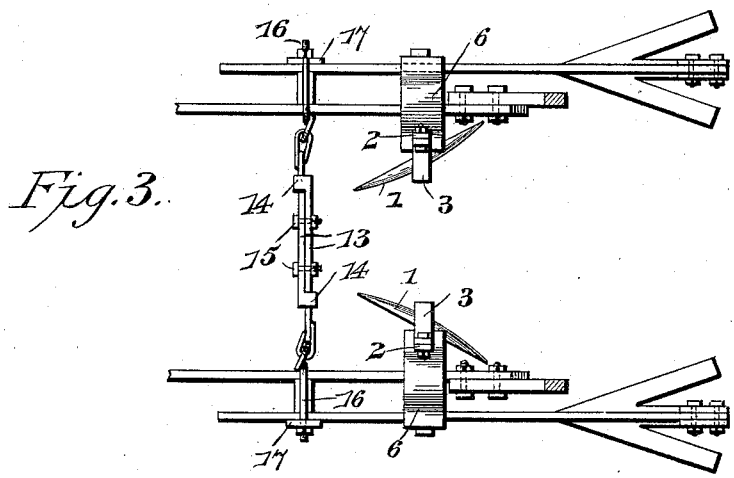
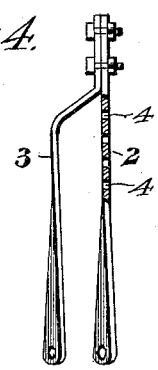 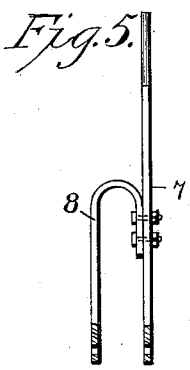 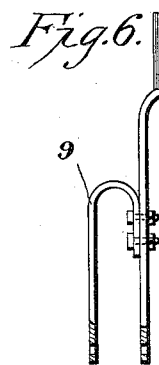 
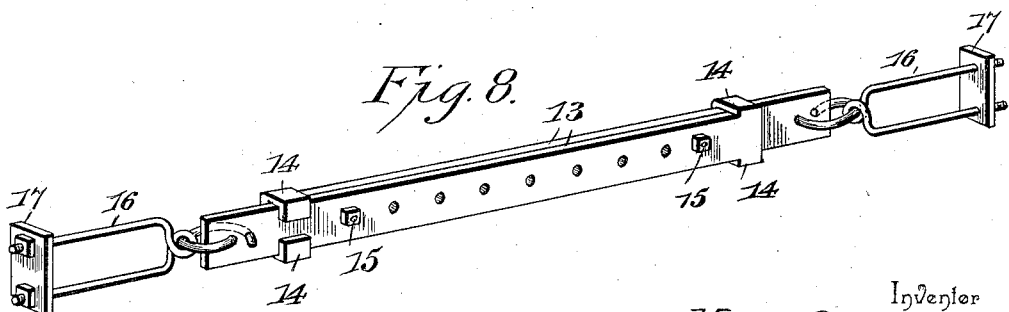
Witnesses
Jas. K. McCathran
V. B. Hillyard
Inventor
Henry Otenhouse
By his Attorneys,
C. A. Snow & Co.
THE NORRIS PETERS CO., PHOTO-LITHO., WASHINGTON, D. C.

UNITED STATES PATENT OFFICE.

HENRY OTENHOUSE, OF McKINNEY, TEXAS.

CULTIVATOR.

SPECIFICATION forming part of Letters Patent No. 608,790, dated August 9, 1898.

Application filed October 29, 1897. Serial No. 656,825. (No model.)

*To all whom it may concern:*

Be it known that I, HENRY OTENHOUSE, a citizen of the United States, residing at McKinney, in the county of Collin and State of Texas, have invented a new and useful Cultivator, of which the following is a specification.

The purpose of the present invention is to provide a disk cutter to be applied to a cultivator of ordinary construction so as to operate in advance of the rear sweeps or plows. Wheel-cultivators are generally provided with a pair of gangs to operate upon each side of a row of plants, and each gang generally comprises a front and a rear shovel or sweep.

This invention has for its object to provide a disk cutter to replace the forward shovels or sweeps of the gangs to cut a trench which is closed by the sweep immediately following.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
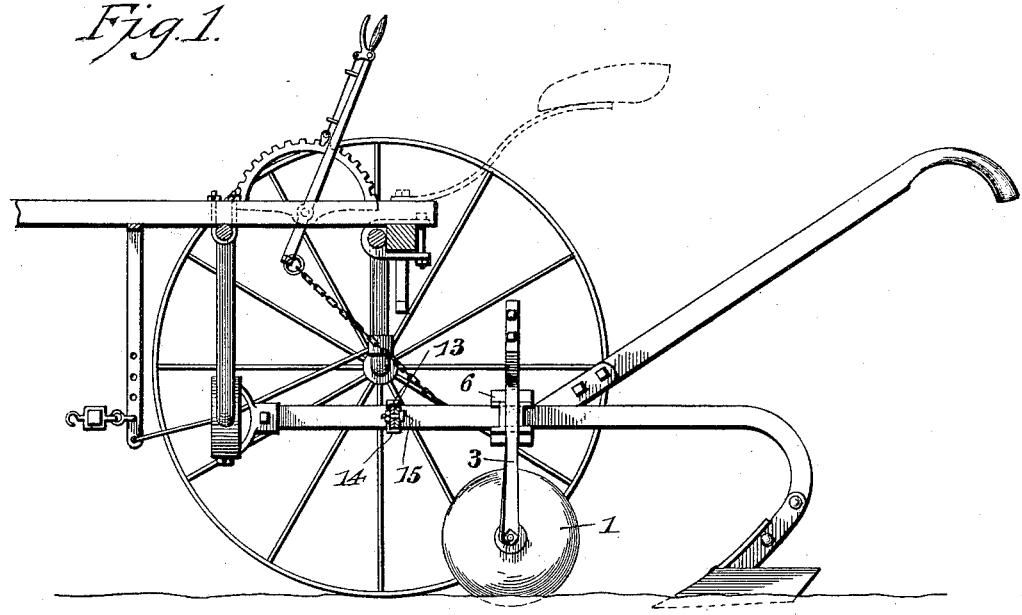
Figure 2:
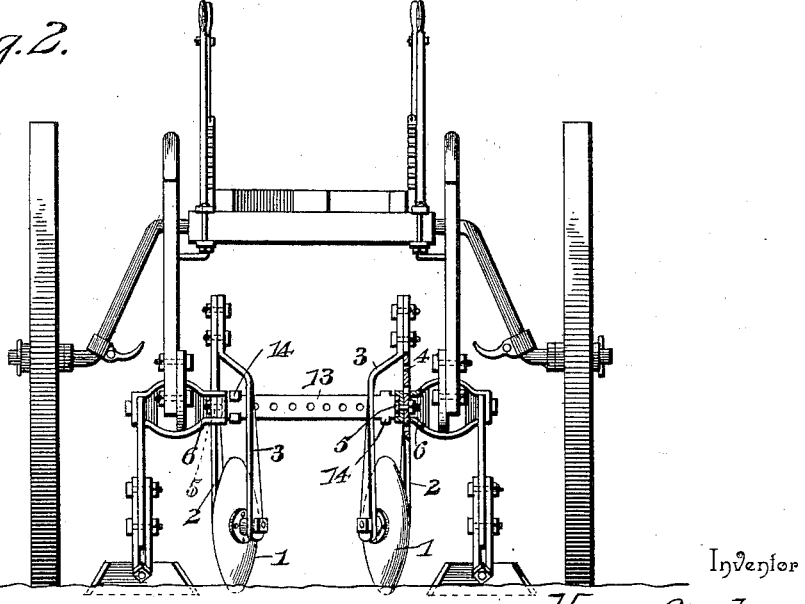

Figure 1 is a longitudinal section of a wheel-cultivator, showing the application of the invention. Fig. 2 is a rear view thereof. Fig. 3 is a detail plan view showing the relation of the disk cutters and the brace. Figs. 4, 5, and 6 represent different forms of yoke-standards for the disk cutters. Fig. 7 indicates a straight standard having an offstanding spindle to receive a disk cutter. Fig. 8 is a detail view of the adjustable brace.

Corresponding and like parts are referred to in the following description and indicated in the several views of the accompanying drawings by the same reference characters.

The cultivator illustrated is of the type to which the invention is to be applied, and comprises a pair of cultivator-gangs and is shown with the forward shovels or sweeps replaced by the disk cutters which constitute the essential feature of this invention. The disk cutters 1 are journaled to the lower ends of standards which have adjustable connection with the cultivator-gangs in the same relation as the forward plows or sweeps which are substituted thereby. These disk cutters are arranged at an angle to the line of motion, so as to cut a trench, which latter is closed by the rear sweeps or shovels.

The standards vary in form according to the style of cultivator for which the attachment is designed, and, as shown in Figs. 4, 5, and 6, the standards are approximately of an inverted-U shape or yoke form and are provided with shanks, by means of which they have adjustable connection with the beams of the gangs. As indicated in Fig. 4, the standard comprises a bar 2 and a curved member 3, the parts 2 and 3 being brought together and secured at their upper ends. The bar 2 is formed with a series of openings 4 to receive a bolt 5, by means of which the standard is adjustably connected with the vertically-slotted ends of the couplings 6. The members or bars 2 and 3 are given a partial twist to throw the disk cutter at an angle to the line of motion of the machine for the purpose stated.

The standard illustrated in Fig. 5 comprises a straight bar 7, having its upper end made rounding, and a bar 8, the latter having its upper end recurved and secured in any substantial manner to the bar 7 at a point between its ends. Fig. 6 illustrates a yoke 9, secured at one side to the lower end of a shank 10, which, like the shank of the bar 7, is made rounding to be adjustably clamped to the cultivator-gangs by eyebolts, as will be readily understood. The standard 11 (illustrated in Fig. 7) has a spindle 12 at its lower end, upon which a disk cutter is mounted, and this standard has adjustable connection with slotted castings or couplings, as herein indicated.

Inasmuch as the rows vary in width and it is desirable to adjust the gangs to a greater or less distance apart, a brace has been devised, and, as shown, consists of similarly-formed plates 13, having a series of openings in their length and provided at their inner ends with lips 14, which are bent to embrace the outer end portions of the opposite plates, thereby holding the two plates together and directing them in their sliding movements. Bolts or fastenings 15 pass through registering openings in the plates 13 and secure them and the cultivator-gangs in the required adjusted position. Clips 16 are secured to the ends of the brace and are adapted to be clamped to the cultivator-gangs and are formed by bending a stout wire or light rod into the form shown, whereby an eye is provided at one end, and parallel members, the latter being threaded to receive clamp-nuts, which force the yoke-plates 17 up against the sides of the cultivator-gangs and secure the clips thereto. The fastenings for attaching the clips to the outer ends of the plates 13 consist of stout wire having one end passed through an opening in a plate and clenched and bent upon itself after passing through the eye of a clip and having its opposite end thrust through a second opening in the plate and upset or clenched, as clearly indicated.

While the standards shown in Figs. 5 and 6 have round shanks and the standard 11 a flat shank, it is to be understood that no invention would be required to provide flat shanks to the one and a round shank to the other and such changes are contemplated within the scope of the invention.

Having thus described the invention, what is claimed as new is—

1. The combination in a cultivator or the like, of frame-beams, a coupling securing said beams together, said coupling having a vertical aperture therethrough, a standard extending through said aperture and having a disk cutter journaled thereon, and means for adjustably securing the standard to the coupling; substantially as described.

2. The combination in a cultivator or the like, of frame-beams, a coupling securing said beams together, said coupling having a vertical aperture therethrough and having an end wall, a standard passing through said aperture and located on the inner side of the end wall, said standard having a vertical series of openings therein and the end wall of the coupling having an opening corresponding to the openings in the standard, and a bolt passing through the opening in the end wall and a suitable opening in the standard, whereby the standard is adjustably secured upon the coupling; substantially as described.

In testimony that I claim the foregoing as my own I have hereto affixed my signature in the presence of two witnesses.

HENRY OTENHOUSE.

Witnesses:
J. P. DOWELL,
S. E. MCCHESNEY.